(12) United States Patent
Cavalheiro et al.

(10) Patent No.: US 10,358,912 B2
(45) Date of Patent: Jul. 23, 2019

(54) TEST TUBE WITH AN INLET FOR FILLING WITH FLUID AND EXPELLING AIR, AND WITH ENHANCED RESISTANCE AND SEALING FOR THE BOP TESTING STEP IN DRILLING SYSTEMS

(71) Applicant: SLIM DRILLING SSERVIÇOS DE PERFURAÇÃO S.A., Belo Horizonte, MG (BR)

(72) Inventors: Antonio Sergio Cavalheiro, Belo Horizonte MG (BR); Leandro Diniz Brandao Rocha, Belo Horizonte MG (BR); Hamilton Suss Junior, Belo Horizonte MG (BR); Jose Roberto Scalon Cotello, Belo Horizonte MG (BR); Ronaldo Soares Eisele, Belo Horizonte MG (BR); Mario Cesar Pereira Dos Santos, Belo Horizonte (BR)

(73) Assignee: SLIM DRILLING SERVICOS DE PERFURACAO S.A., Belo Horizonte, MG (BR)

( * ) Notice: Subject to any disclaimer, the term of this patent is extended or adjusted under 35 U.S.C. 154(b) by 62 days.

(21) Appl. No.: 15/267,678

(22) PCT Filed: Mar. 19, 2014

(86) PCT No.: PCT/BR2014/000086
§ 371 (c)(1),
(2) Date: Sep. 16, 2016

(87) PCT Pub. No.: WO2015/139098
PCT Pub. Date: Sep. 24, 2015

(65) Prior Publication Data
US 2017/0152740 A1 Jun. 1, 2017

(51) Int. Cl.
*G01M 3/02* (2006.01)
*E21B 33/06* (2006.01)
(Continued)

(52) U.S. Cl.
CPC .......... *E21B 47/1025* (2013.01); *E21B 33/06* (2013.01); *G01M 3/02* (2013.01); *G01M 3/022* (2013.01); *G01M 3/2846* (2013.01)

(58) Field of Classification Search
CPC ............................. E21B 47/1025; G01M 3/02
(Continued)

(56) References Cited

U.S. PATENT DOCUMENTS 4,030,354 A * 6/1977 Scott ....................... E21B 33/06
73/152.01
4,306,447 A 12/1981 Franks, Jr.
(Continued)

FOREIGN PATENT DOCUMENTS

CN 202676428 U * 1/2013 ............ G01M 13/00
WO 199850676 11/1998

OTHER PUBLICATIONS

English Translation of CN202676428U Bibliographic Data and Description, Date of Patent: Jan. 16, 2013, Publisher of BibData: Espacenet, Euroopean Patent Office, Publisher of Description Translation: Google, pp. 3.*
(Continued)

*Primary Examiner* — Andre J Allen
(74) *Attorney, Agent, or Firm* — Houtteman Law LLC

(57) ABSTRACT

Fluid tube for sealing test in a BOP chamber. The test tube used in the BOP chamber resistance test step has its hollow structure filled internally and totally through a fluid input. The tube obtains an effective sealing due to the filling fluid volume that exhausts the air within it, stopped internally with the couplings of screwed pin threads and a female thread of a plug or test plug, preventing the test fluid into the chamber to leak and enter the hollow structure of the chamber. The supplementary structure anti-distortion system including air absence inside the tube and test tube stoppage
(Continued)

the system avoids false pressure into the chamber to the sensors distributed therein, not detecting false leakages, making the BOP resistance analysis against potential oil/gas leakages precise during the probing procedure.

3 Claims, 6 Drawing Sheets

(51) Int. Cl.
*E21B 47/10* (2012.01)
*G01M 3/28* (2006.01)

(58) Field of Classification Search
USPC .............................................................. 73/40
See application file for complete search history.

(56) References Cited

U.S. PATENT DOCUMENTS

| | | | |
|---|---|---|---|
| 4,347,733 A | 9/1982 | Crain | |
| 6,032,736 A | 3/2000 | Williams | |
| 6,044,690 A | 4/2000 | Williams | |
| 9,841,343 B1 * | 12/2017 | Hellail | G01M 3/02 |
| 9,891,131 B1 * | 2/2018 | Zilai | G01M 3/02 |
| 2010/0228399 A1 * | 9/2010 | Udischas et al. | F17C 13/04 |
| | | | 700/282 |

OTHER PUBLICATIONS

International Search Report, PCT/BR2014/000086, dated Oct. 21, 2014, total pp. 9.

* cited by examiner

FIG. 2
FIG. 3
CORTE A-A
FIG. 4
DET. A
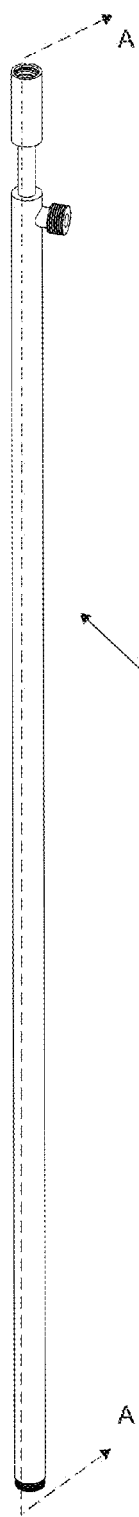
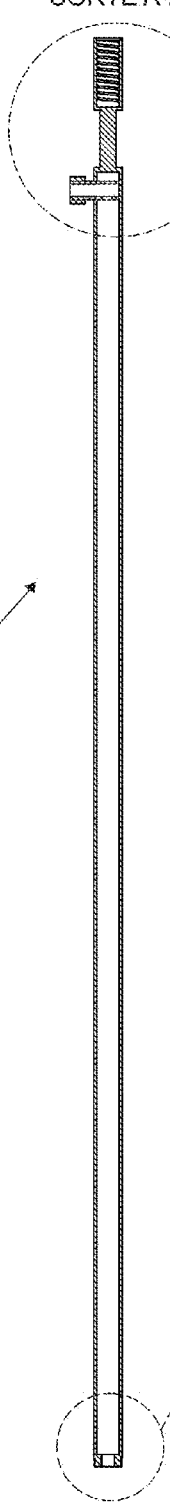
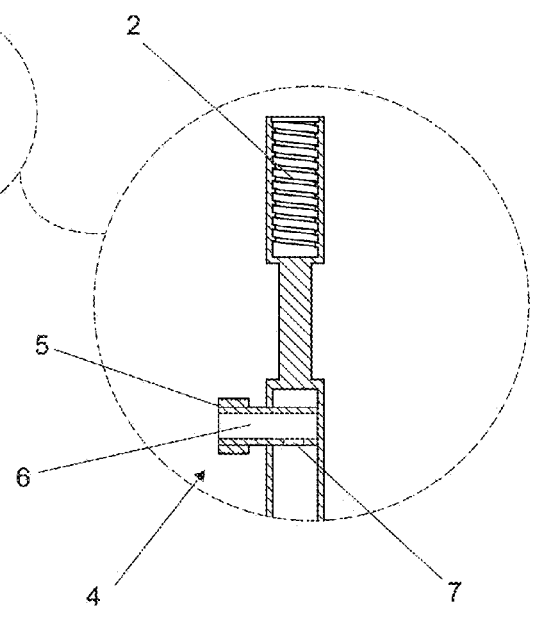
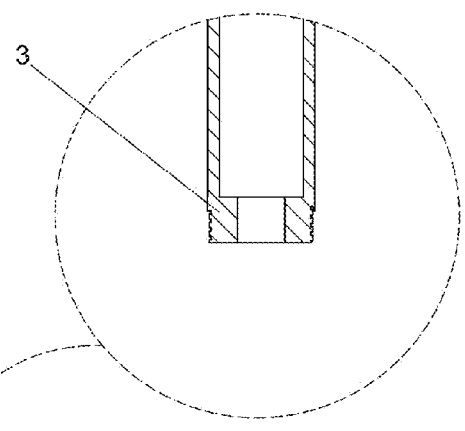

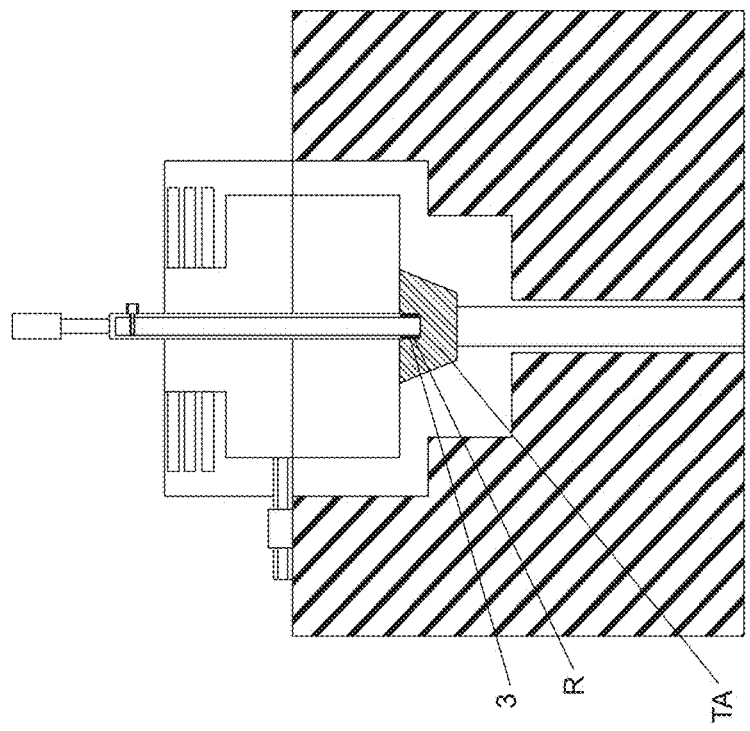
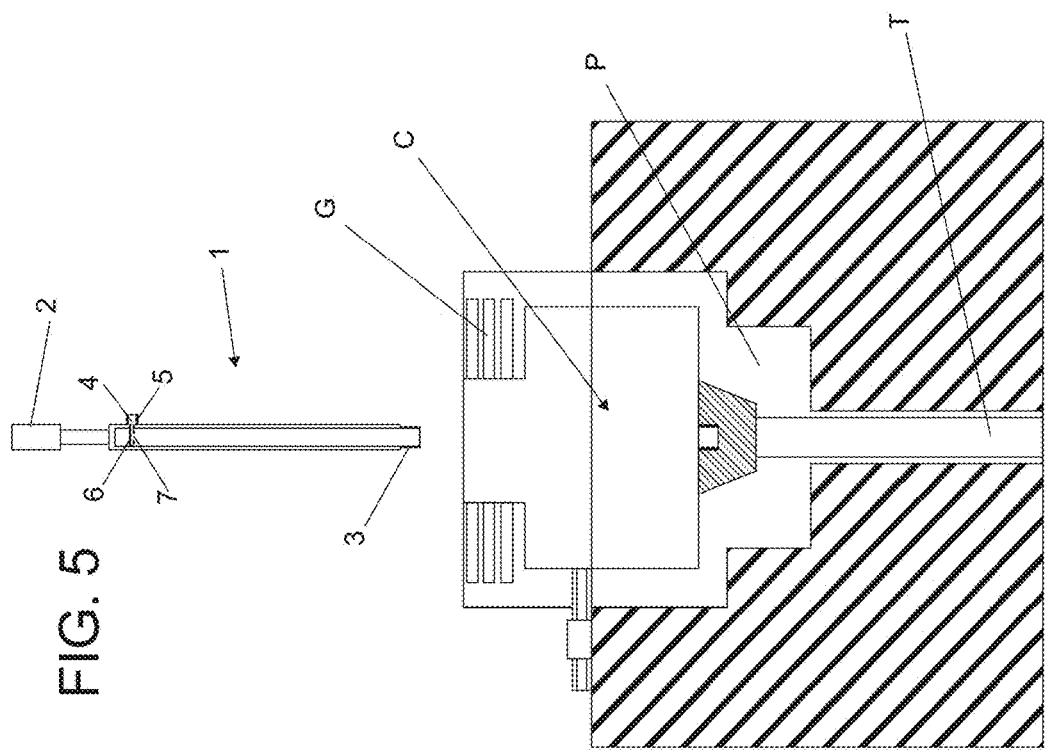

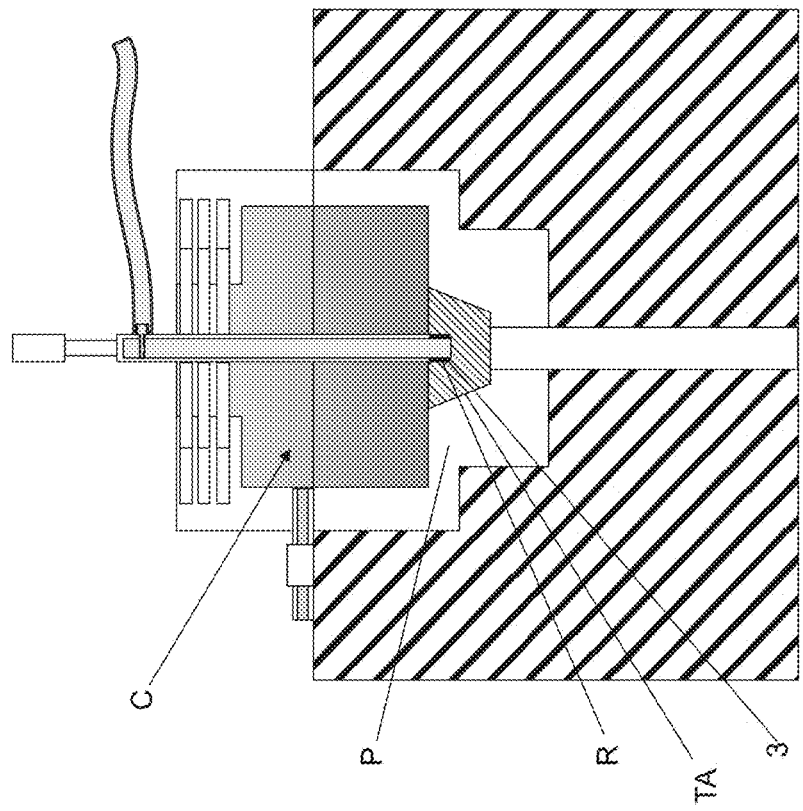
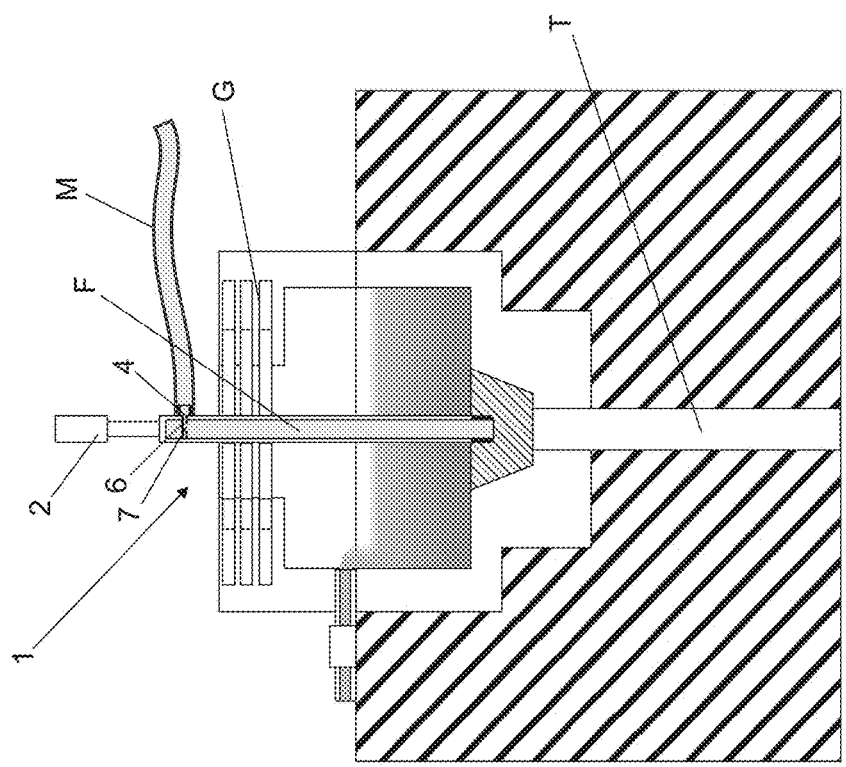

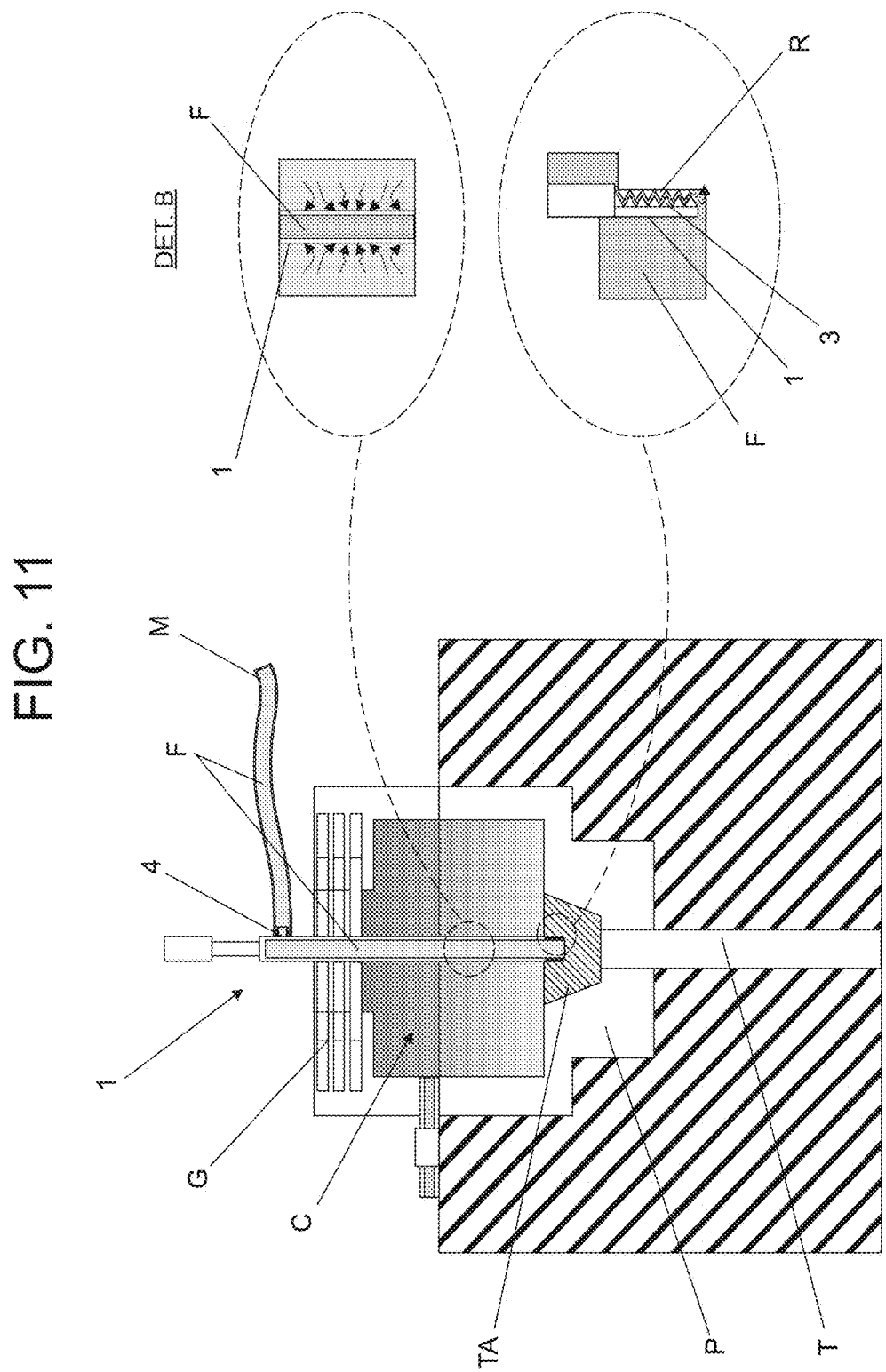

TEST TUBE WITH AN INLET FOR FILLING WITH FLUID AND EXPELLING AIR, AND WITH ENHANCED RESISTANCE AND SEALING FOR THE BOP TESTING STEP IN DRILLING SYSTEMS

The descriptive report hereof refers to a patent of invention request for a system developed to increase the structural resistance and sealing in the tube used in the test step needed to detect leakages and BOP ('Blow Out' prevention system) resistance.

The system may, from an adaptation (fluid input) designed in the test tube that allows it to receive fluid injections within it, avoiding its hollow structure to distort during the BOP chamber test, as well as avoiding airlocks inside the tube and forming a seal against fluid leakage through the screwed pin, sealing it properly.

TECHNICAL STATUS

As it is known by probing system technicians of oil/gas shafts, one of the first steps before the drilling is the pre-shaft head and the shaft head—a concrete lower layer in the ground fitted with valves and supports around a spot (a passage drilled previously), where the drilling column and drill will be inserted. At the bottom of the pre-shaft, around the spot as well, in the passage drilled previously, an equipment named as drill shaft head is installed, which is no more than a conical housing, fitted with valves and recipients, then BOP is assembled over such equipment—i.e., a safety device that consists of retractable sealing drawers with input valves and fluid outlets, which wrap and seal the shaft head externally, avoiding the unwanted and uncontrolled gas flow (inflow) derived from the underground, without reaching the platform.

Therefore, a chamber is created between the shaft head and BOP drawers.

After such procedures (still before starting the drilling), BOP must be tested to ensure that there is no chance of occurring any flammable material leakage to the surface (platform) in case there is an unwanted gas inflow, wherever it occurs through between its drawers or other joint spots formed in the chamber.

For such test, a test plug is manufactured according to said conical housing, as the BOP test plug also has a female thread terminal in its upper surface. Through the probing lifting system, such test plug is perfectly set due to its conical structure in the shaft head conical housing, sealing the spot drilled previously in the ground and equipped by the female terminal, as it then receives the screwed pin of the lower edge of a tube designed as BOP tube, whose tubular structure extends the BOP above after being screwed. After closing BOP drawers, the tubular structure is wrapped in BOP chamber, exposing only its platform upper edge above. By valves connected to a fluid injection system pump, the chamber is then filled slowly and the pressure test for sealing drawers and BOP valves are carried out.

BOP test tube replaces the drilling column or the coating column presence, as they have the same diameter in BOP chamber. Such replacement is necessary to be done before inserting the drilling column and operation start to detect, by means of detectors, if there is any leakage, whether it be through the sealing drawers or other closed BOP spots. Such pressure applied by the slow fluid injection against sealing drawers and closed valves must be stabilized in the test, according to probing system parameters, and if leakage is not detected by the sensors it is then indicated the BOP test tube may be removed and the drilling column may be inserted to start probing, reducing potential risks of oil or gas leakage through BOP and to reach the platform during the said drilling procedure.

This analysis (previous leakage detection test), as it is extremely precise, it can be impaired in the test due to factors related to the structural resistance of the own test tube that, as it is hollow, it can be deformed after taking strong pressure in the chamber, or due to the air presence inside the test tube. Potential distortions create a tube structure decrease, proportional to the dimensional increase inside the chamber, resulting in a pressure relieve that is detected by the sensors. The air presence within the tube, as it is extremely compressed, may present distortions inside the test tube, resulting in false tests. The pressure reduction effect may confuse the operator during the analysis, detecting false leakages in BOP.

Other concern factor related to false leakages occur by the screwing of the tube screwed pin and the test plug female slot, in which the test fluid escapes from screwed thread gaps and it is forced to enter the tube. In this case, a pressure relieve also occurs in the chamber, which is detected by the sensors as a leakage and may confuse the BOP leakage condition analysis as well.

Patent Objective

The concerned test tube has an input on its upper edge, through which its hollow structure may be filled with fluid, forming a system to increase its structural resistance against distortions, as well as eliminate the air presence within the tube. This filling fluid will even form, also inside the test tube hollow structure, a seal together with the coupling between screwed pin threads and the test plug female thread.

After taking the big pressure applied by the test fluid injected in the chamber, there is no distortion and leakage to the penetrate within its filled structure.

Thus, 'pressure drops' are canceled, avoiding false test fluid leakage detections inside BOP chamber, making the analysis totally precise, presenting safety and ensuring the shaft sealing is effective against potential inflows during the future drilling step, when the drill and drilling column are working.

In an overview, the test tube and the structural resistance-increase system and the sealing around it are as follows, as they will be detailed further.

BRIEF DESCRIPTION OF THE DRAWINGS

FIG. 2 is a perspective view of the test tube,
FIG. 3 is the A-A section of FIG. 2,
FIG. 4 is detail 'A' from FIG. 3,
FIG. 5 shows the test tube as it is inserted through BOP drawers,
FIG. 6 shows the test tube screwed into the drill shaft head housing,
FIG. 9 shows the test tube filled for the resistance test,
FIG. 10 shows the chamber filled for the resistance test,
FIG. 11 shows the test tube hollow structure with detail 'B' expanded at the side.

The FIG. 1 sequence below describes the technical status and the problems occurred during the test analysis, due to the detection of false leakages inside BOP chamber, as a result of air presence into the tube, the test tube distortion and test fluid input through the screw thread inside its hollow structure.

Figure 1:
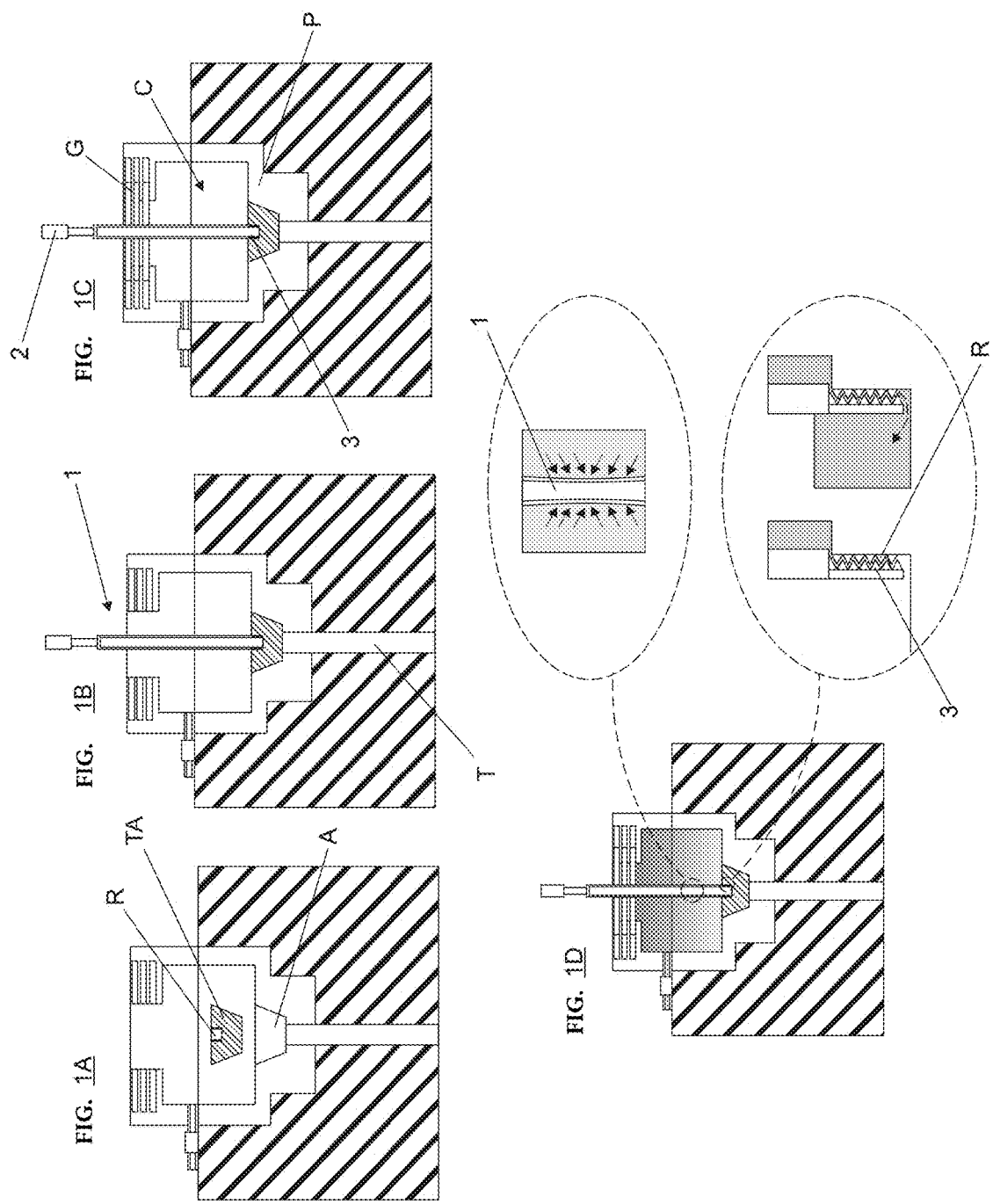
FIGS. 1A-D are a sequence describing the test analysis.

FIG. 1—sequential view which shows, in 1A, the conical plug insertion inside the conical housing in the spot briefly drilled in the ground, at the shaft head. In 1B, it shows the insertion through BOP drawers, in the test tube, screwed by the screwed pin in the test plug female thread. In 1C, it shows the BOP drawers closing, wrapping the test tube structure intermediate part that is kept inside the chamber, formed in the drill shaft head. In 1D, it shows the test fluid injection within the chamber. In expanded details, at the side it is shown that the test tube hollow structure is deformed while undergoing through high pressure in the chamber. It also shows that the fluid escapes through the test tube screwed pin threads and the plug female thread, entering and accumulating inside the hollow structure.

Figure 7:
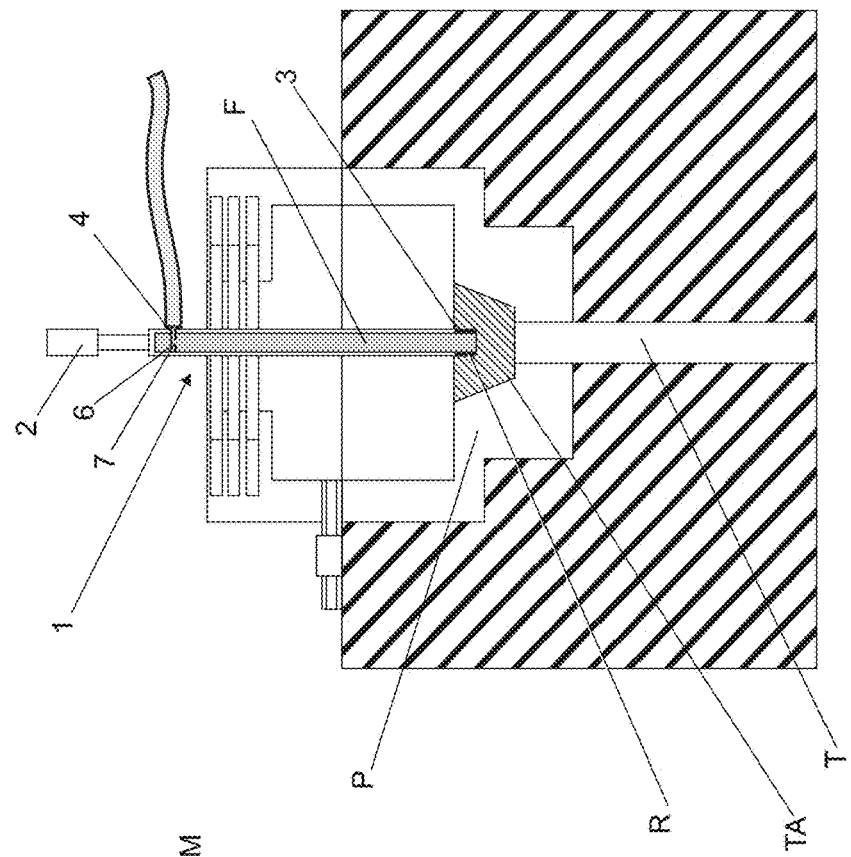
FIG. 7 shows the closed BOP drawers wrapping the test tube structure inside the chamber.
Figure 8:
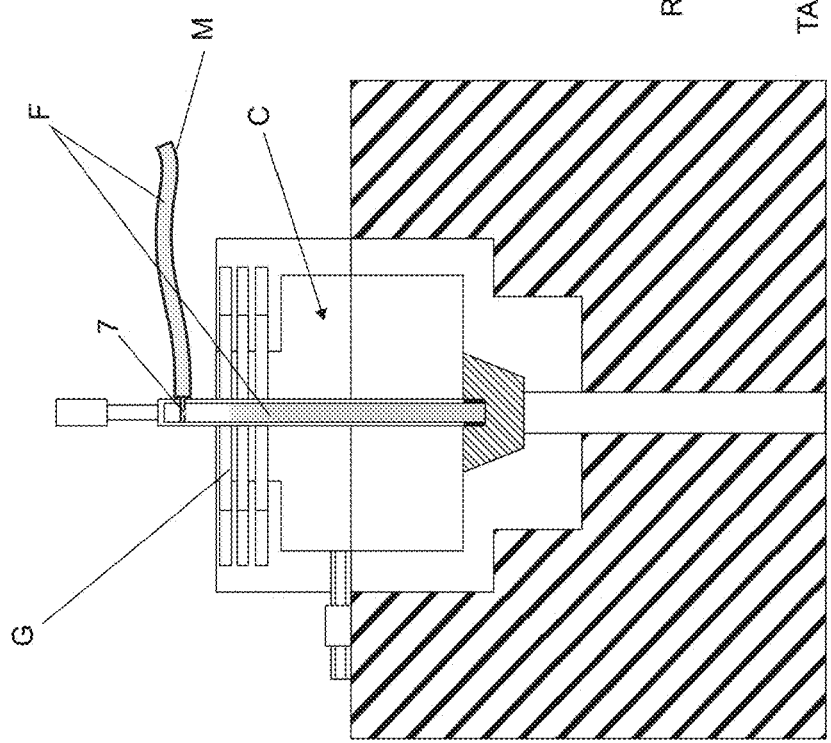
FIG. 8 shows the test tube hollow structure filled with fluid up to its lower edge.

The figures below, from 2 to 12, show the adaptation in the test tube and to the anti-distortion system and sealing that wraps it:

FIG. 2—perspective view of the test tube, showing the upper screwed terminal, the adaptation formed by the fluid input and, on the lower edge, its screwed pin. In such view, A-A section is indicated;

FIG. 3—A-A section;

FIG. 4—Details 'A', which shows the test tube upper edge, adapting its fluid input and the lower edge with its screwed pin;

FIG. 5—diagram view that shows the test tube, adapted with its fluid input, as it is inserted through the open BOP drawers;

FIG. 6—view according to previous figure, which shows the test tube screwed by its screwed pin, in the plug test female thread of the drill shaft head housing;

FIG. 7—view according to previous figure, which shows closed BOP drawers, wrapping the test tube structure inside the chamber, exposing its upper edge with the fluid input in the platform;

FIG. 8—view according to previous figure, showing that the test tube had its hollow structure filled with the fluid up to its lower edge, as said fluid was stopped within along with the screwed threads to the plug female thread;

FIG. 9—view according to previous figure, it shows the test tube already filled with the fluid, as it starts the BOP pressure and resistance test, with the fluid injection test in the chamber;

FIG. 10—view according to previous figure, it shows the chamber already filled for the resistance test;

FIG. 11—view according to previous figure, which shows the test tube hollow structure under high pressure in the chamber without distortions, in 'B' details expanded at the side. It also shows that the test fluid being injected under high pressure within the chamber does not enter through the screwed pin threads and by the plug female thread, not entering within the test tube consequently.

In compliance to the attached drawings, the 'TEST TUBE WITH FLUID-FILLING INPUT FOR AIR EXHAUSTION, RESISTANCE INCREASE AND SEALING IN THE BOP TEST STEP IN PROBING SYSTEMS', object of the patent of invention request hereof, it consists of the test tube (1), of a structure used in the chamber (C) resistance test step, formed over the the passage (T) initially drilled in the ground, between the drill shaft head (P) and the retractable drawers (G) of BOP ('Blow Out' prevention system), in gas/oil probing procedures, as shown in FIG. 1 sequence.

The said test tube (1), generally equipped with a screwed upper terminal (2) and lower screwed pin (3), presenting a new feature for the project, as shown in FIGS. 2, 3 and 4, receives in its upper edge, immediately below the said upper terminal (2), a fluid input (4) with an outer nozzle (5) followed by an inner channel (6) fitted with a connecting duct (7) inside the hollow tubular structure.

With such new development, the test tube (1) is screwed normally by its lower screwed pin (3) in the female thread (R) of the plug (TA) of the BOP chamber (C) housing (A), as shown in FIGS. 5 and 6, then the drawers (G) are closed. In this condition, the test tube (1) structure inside the chamber (C) is wrapped by closing the drawers (G), then receiving the hose coupling (M) through the fluid input (4) nozzle (5) of a filling fluid recipient (not shown), as FIG. 7 shows.

As FIG. 8 shows, the filling fluid (F) enters through the channel (6), exhausting all air within and, through the duct (7) it fills internally and totally the test tube (1) hollow structure, as such volume is stopped along with the screwed threads of the lower screwed pin (3) and its female thread (R) of the plug (TA).

The invention claimed is:

1. A test tube with fluid-filling input comprising a hollow-structure test tube having a tubular hollow body configured to be used in a resistance test step of a chamber formed over a passage initially drilled in ground, between a drill shaft head and retractable drawers of a Blow Out Prevention system (BOP) in gas/oil probing procedures, said hollow-structure test tube being equipped with a screwed upper terminal and a lower screwed pin, the hollow-structure test tube having a fluid input in an upper edge, the fluid input having an outer nozzle the fluid input being right below the upper terminal followed by an inner channel which presents a connecting duct inside the tubular hollow body of the hollow-structure test tube, wherein after injecting the test fluid for the resistance test step and BOP leakage in the chamber filling fluid volume within the test tube while air is exhausted, thereby the test tube is provided with tubular structure structural resistance against distortions.

2. The test tube with fluid-filling input according to claim 1, wherein the hollow-structure test tube is configured to be screwed by the lower screwed pin in a female thread of a cap in the chamber of housing and the retractable drawers of the BOP are configured to be closed, and the test tube is filled internally and completely by a filling fluid which is introduced through a hose of a fluid recipient attached to the outer nozzle of the fluid input, entering by the inner channel and through the connecting duct, a filling fluid volume of the fluid in the, in the hollow-structure test tube being stopped with a screw thread of the lower screwed pin with the female thread of a cap.

3. according to claim 1 wherein the filling fluid volume being filled and stopped internally with the coupling between the screw threads of the lower screwed pin and the female thread of the cap resulting in an effective sealing.

* * * * *